No. 632,405. Patented Sept. 5, 1899.
C. E. FITZGERALD & G. PRESCOTT.
METHOD OF PRESERVING FOOD.
(Application filed Dec. 20, 1897.)
(No Model.)
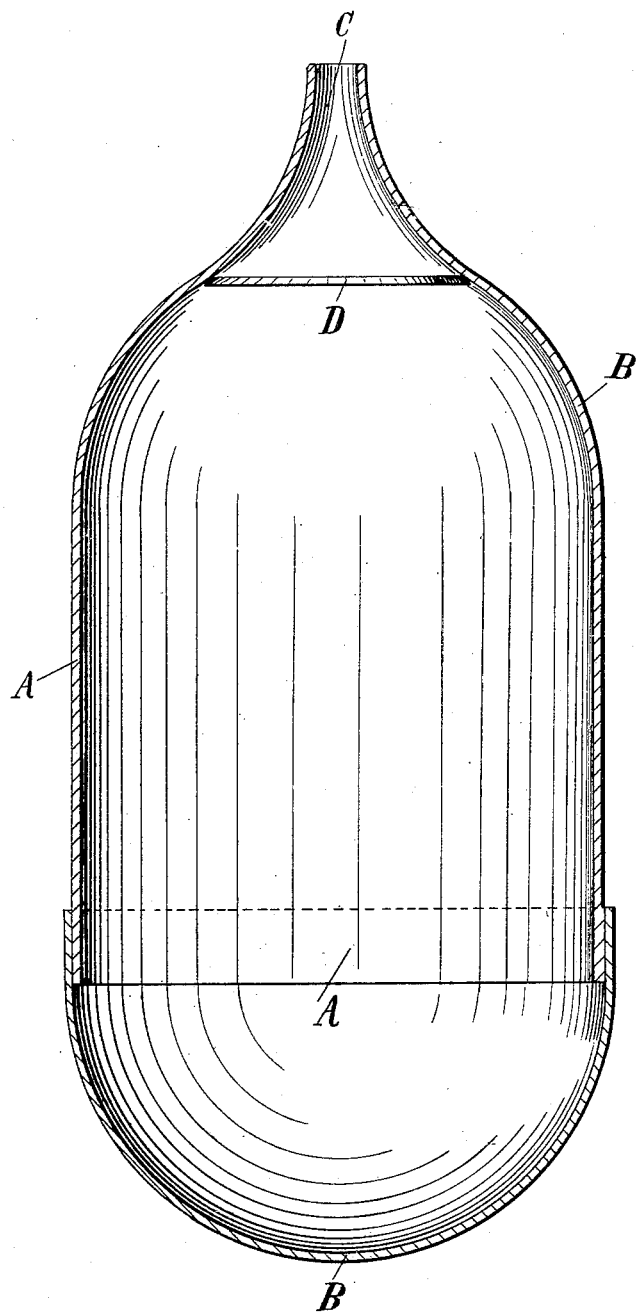
Witnesses
George M. Richards
G. H. Walmsley.
Inventors
Charles Edward Fitzgerald
George Prescott
by Wm. H. Babcock
Attorney

UNITED STATES PATENT OFFICE.

CHARLES EDWARD FITZGERALD AND GEORGE PRESCOTT, OF DUBLIN, IRELAND.

METHOD OF PRESERVING FOOD.

SPECIFICATION forming part of Letters Patent No. 632,405, dated September 5, 1899.

Application filed December 20, 1897. Serial No. 662,729. (No specimens.)

*To all whom it may concern:*

Be it known that we, CHARLES EDWARD FITZGERALD, M. D., surgeon oculist to the Queen in Ireland, and GEORGE PRESCOTT, subjects of the Queen of Great Britain, both residing at Dublin, Ireland, have invented a certain new and useful Method of Packing Food, (a patent for which has been granted in the United Kingdom, No. 29,252, A. D. 1896,) of which the following is a specification.

Heretofore foods which have been "packed" in metallic vessels, or, indeed, in vessels of any kind, have lost a large proportion of their value as food, because the prolonged application of heat necessary to preserve them from decomposition spoils in a great measure the flavoring properties (important salivary excitants) and by destroying the bacteria and their spores deprives the food of other aids to that sort of decomposition known as "digestion."

In food heretofore packed if the prolonged heating has not been applied then an antiseptic adulterant of some kind has been used—as boric acid, salt, sugar, sulfurous acid, or the like. Salt or sugar acts as a preservative by robbing the bacteria of water and so retarding their growth. The use of boric acid is objectionable, as it retards and often altogether prevents the decomposition of food when introduced into the stomach, and none of these preservatives can be subsequently removed from the food without greatly injuring it as such.

Heretofore foods packed in packing-cans have besides being subjected to prolonged heating the air driven out by the formation of steam in the can, which is then hermetically sealed, thus causing a partial vacuum when the can cools, fresh air and any bacteria which it might contain being thus excluded from the can.

The objects of our invention are, first, to pack foods so that they will preserve successfully without the addition of any antiseptic adulterant, except such as will be automatically dissipated upon the opening of the can; second, to retain the natural juices of the food by avoiding a prolonged application of heat; third, to avoid the application of so much heat as will burst the capsules of the spores, and, fourth, to attain the above objects inexpensively.

In order to carry our invention into effect, we have provided a packing-can which is intended to bear an internal pressure of several atmospheres.

Our cans are made of tinned steel plate, the body being cylindric and the ends preferably hemispherical. At one end is a small hole and a valve opening inward. The end with the valve is attached to the body. The other end is not soldered until the food is introduced.

While the food is being packed the can is held valve end downward, the valve, which is much larger in diameter than the opening, having been adjusted in position. The food is pressed against the valve, keeping it home, and the end is then soldered on. The can is now subjected for about fifteen minutes to a temperature of from about 140° to about 176° Fahrenheit, which will kill the bacteria, but not their spores. As the cans become cool we inject aerated gravy or blood through the small hole in each can, such injection being continued until the pressure is sufficient to keep the spores in suspended animation. This is attained with certainty by a pressure of about eighty pounds per square inch; but it may be attained, though less perfectly, by a somewhat lower pressure. Accordingly in practice we inject at such pressure as will leave in the case a permanent pressure of about eighty pounds, when the expansion of the can and the absorption of some of the gas in the aerated liquid by the products to be preserved has taken place. This will be effected in ordinary cases by injecting at a pressure of one hundred pounds per square inch. This injection is effected from the outside through the opening closed from within by the valve, sufficient pressure being exerted upon the injected medium, which may be antiseptic, in the case of certain kinds of foods, to cause it to force the valve inward. The pressure exerted outwardly by this injected medium operates also in forcing said valve against said opening, so as to close the same, and thus hermetically seal the contents. We prefer to use these aerated liquids rather than carbonic-acid gas by itself in a gaseous state, because they are very convenient for conveying the pressure to the interior of the can and because when blood or gravy is used the liquid serves to improve the product by preserving its natural qualities.

The valve is a simple disk of thin metal, and such a valve has advantages over those having carefully-fitted seats and guides, unless these be made of a strength that is objectionable and expensive, because the end of the can, even if hemispherical in form, alters its shape when subjected to internal pressure, such alteration disturbing the adjustment of the valve, and thus setting up leakage. Again, valves consisting of glass balls on rubber seatings are unsatisfactory, for the reason that shreds of food are liable to be blown between the ball and rubber and unlike liquids are not squeezed out. These shreds, although apparently impervious, permit diffusion to occur through their tissue, and in time the internal pressure becomes so low that the spores burst into life, and thus defeat the main object. For the same reason neither cork nor wood are permissible in connection with the valve, these substances being pervious to diffusion. On the other hand, a thin impermeable disk of metal, much larger in diameter than the hole it is intended to cover, adapts itself to the changing shape of the end of the can at the opening, the shape of the latter changing as it does because of the varying temperatures and pressure. Such disk acts more perfectly when untrammeled by guides or such like, inasmuch as it is then free to automatically adjust itself, being thin and flexible to points of least resistance. Such a disk acts as a baffle to shreds of food, and being much larger than the small opening at the end of the can thus differs from valves with ground-seatings or with glass balls and rubber rings, which have their points of contact "exposed," so to speak, to the contents of the can, the sharp edges of the disk acting as a trap for any stray shreds blowing in that direction, owing to any blowback during the process of injection.

Having now particularly described the nature of our invention and in what manner the same is to be performed, we declare that what we claim is—

The process of preserving food, consisting in the following steps; first, subjecting it while inclosed to a temperature of from 60° to 80° centigrade for killing the bacteria without destroying the spores; secondly, injecting aerated gravy until the internal pressure is from eighty to one hundred pounds to the square inch, the same being sufficient to preserve the spores in a state of suspended animation without rupturing them, and finally, sealing the food hermetically under the said pressure, substantially as set forth.

Dated this 10th day of December, 1897.

CHARLES EDWARD FITZGERALD.
GEORGE PRESCOTT.

Witnesses:
JOHN PRESCOTT,
GEORGE PRESCOTT, Jr.